US012800327B2

(12) United States Patent
Einhorn et al.

(10) Patent No.: US 12,800,327 B2
(45) Date of Patent: Nov. 17, 2026

(54) METHOD FOR PROVIDING A MACHINE-LEARNING BINARY CLASSIFICATION MODEL FOR PREDICTING THE AVAILABILITY OF MAP-BASED LOCALIZATION

(71) Applicants: ROBERT BOSCH GMBH, Stuttgart (DE); CARIAD SE, Wolfsburg (DE)

(72) Inventors: Erik Einhorn, Sarstedt (DE); Pierre Lothe, Hildesheim (DE); David Oertel, Hannover (DE); Hans-Georg Raumer, Hildesheim (DE)

(73) Assignees: ROBERT BOSCH GMBH, Stuttgart (DE); CARIAD SE, Wolfsburg (DE)

( * ) Notice: Subject to any disclaimer, the term of this patent is extended or adjusted under 35 U.S.C. 154(b) by 0 days.

(21) Appl. No.: 19/299,418

(22) Filed: Aug. 14, 2025

(65) Prior Publication Data

US 2026/0049826 A1 Feb. 19, 2026

(30) Foreign Application Priority Data

Aug. 15, 2024 (DE) ..................... 10 2024 123 347.8

(51) Int. Cl.
*B60B 39/00* (2006.01)
*G01C 21/34* (2006.01)
(Continued)

(52) U.S. Cl.
CPC ....... *G01C 21/3476* (2013.01); *G06V 10/764* (2022.01); *G06V 10/774* (2022.01); *G06V 20/13* (2022.01)

(58) Field of Classification Search
CPC .... G01C 21/32; G01C 21/34; G01C 21/3476; G05D 1/00; G05D 1/0246; G06V 10/764; G06V 10/774; G06V 20/13
(Continued)

(56) References Cited

U.S. PATENT DOCUMENTS 10,152,056 B2 * 12/2018 Rohde ................. B60W 60/007
10,200,882 B1 * 2/2019 Nelapati ................. H04W 4/44
(Continued)

OTHER PUBLICATIONS

Nubert, Julian, et al. "Learning-based localizability estimation for robust lidar localization." 2022 IEEE/RSJ International Conference on Intelligent Robots and Systems (IROS). IEEE, 2022.
(Continued)

*Primary Examiner* — Andrew Joseph Rudy
(74) *Attorney, Agent, or Firm* — Perry + Currier Inc.

(57) ABSTRACT

Method for providing a machine learning binary classification model (7) for predicting the availability of a localization map, comprising the following steps of:

a) performing a reference journey with a real vehicle, wherein a reference trajectory (1) and referenced landmark positions (2) surrounding the reference trajectory (1) are recorded,
b) performing a journey along the reference trajectory (1) with a fictitious vehicle, wherein a trajectory (3) and landmark positions (4) surrounding the trajectory (3) are estimated using the localization function,
c) providing a training data set having data points such that a data point comprises first information for describing a map section and second information for indicating the localization availability of that map section, wherein the map section corresponds to the environment of the reference trajectory (1), and the second information is determined based on the comparison of the reference trajectory (1) with the estimated trajectory (3) and/or on the comparison of the referenced landmark positions (2) with the estimated landmark positions (4), and
d) training the classification model (7) with the training data set using artificial intelligence.

14 Claims, 3 Drawing Sheets

(51) Int. Cl.

| | |
|---|---|
| ***G06V 10/764*** | (2022.01) |
| ***G06V 10/774*** | (2022.01) |
| ***G06V 20/13*** | (2022.01) |

(58) Field of Classification Search

USPC .......................................................... 701/447

See application file for complete search history.

(56) References Cited

U.S. PATENT DOCUMENTS

| | | | | |
|---|---|---|---|---|
| 11,594,014 | B2 * | 2/2023 | Zeng | G06T 7/32 |
| 12,644,712 | B2 * | 6/2026 | Kabalar | G01C 21/28 |
| 2018/0088234 | A1 | 3/2018 | Scherer et al. | |
| 2021/0200237 | A1 | 7/2021 | Kesten | |
| 2021/0310812 | A1 | 10/2021 | Connell et al. | |

OTHER PUBLICATIONS

Zhen, Weikun et al. "Robust localization and localizability estimation with a rotating laser scanner." 2017 IEEE international conference on robotics and automation (ICRA). IEEE, 2017.

* cited by examiner

METHOD FOR PROVIDING A MACHINE-LEARNING BINARY CLASSIFICATION MODEL FOR PREDICTING THE AVAILABILITY OF MAP-BASED LOCALIZATION

PRIOR ART

The present invention relates to a method for providing a machine-learning binary classification model for predicting the availability of map-based localization and to a method for providing a localization map having additional availability information using this machine-learning binary classification model. A localization map having additional availability information is also proposed. The invention can be used in particular in map-based localization for autonomous or partially autonomous driving.

Map-based localization is based on comparing sensor data with map data. The position and pose of a vehicle can be estimated from this comparison. The sensor data can be captured by at least one sensor installed in the vehicle such as a camera, radar, lidar and/or GNSS. The map data can be obtained from a localization map and typically include information about landmarks such as road markings, traffic signs, traffic lights, etc.

There are currently two known approaches to generating such a localization map. On the one hand, surveying vehicles equipped with special high-end sensors are used, such that sensor data can be captured using the high-end sensors and a localization map can be generated from the captured sensor data. The other approach is based on crowd-source data, wherein, instead of surveying vehicles, only end-customer vehicles are used, which capture sensor data during the journey and upload them to a cloud, such that a localization map can be generated from the uploaded sensor data in the backend.

However, in both approaches, some map sections of the generated localization map may not contain enough landmarks, and so vehicle localization based on this localization map may fail. This is the case, for example, with the crowd-source data approach when there are not enough end-user vehicles driving on a road and therefore not enough data about that road can be collected. However, this is also generally the case if the road infrastructure does not contain much information (e.g. a country road without road markings). In addition, an incorrect localization map (e.g. missing landmarks) can also lead to failed vehicle localization.

There is therefore the desire to provide a localization map having additional availability information that can indicate which map sections of the localization map can and cannot be used for localization. This availability information is also critical for localization systems because it defines the operational domain (ODD), i.e. where the localization function of a localization system can and cannot be activated.

A known approach to checking the availability of map-based localization is based on using ground truth by virtue of a vehicle driving across an entire localization map in order to check whether or not the localization based on that localization map works. Ground truth generally refers to real information obtained during the data collection phase through observation and measurement rather than through conclusions. This approach is therefore limited to small-scale localization maps.

On the basis of this, it is the object of the present invention to alleviate or at least partially solve the problems described with reference to the prior art. In particular, the intention is to specify a solution that can be used to predict the availability of a localization map, which has already been generated using known approaches, regardless of ground truth and map size, and thus to also predict the availability of large-scale localization maps.

DISCLOSURE OF THE INVENTION

A method for providing a machine-learning binary classification model contributes to this, which model can be used to predict the availability of a localization function that is performed based on a localization map, wherein the method comprises the following steps:

a) performing a reference journey with a real vehicle, wherein a reference trajectory and referenced landmark positions surrounding the reference trajectory are recorded, b) performing a journey along the reference trajectory with a fictitious vehicle, wherein a trajectory and landmark positions surrounding the trajectory are estimated using the localization function, c) providing a training data set having data points such that a data point comprises first information for describing a map section and second information for indicating a localization availability of the localization function for that map section, wherein the map section corresponds to the environment of the reference trajectory, and the second information is determined based on the comparison of the reference trajectory with the estimated trajectory and/or on the comparison of the referenced landmark positions with the estimated landmark positions, and d) training the classification model with the training data set using artificial intelligence.

The classification model provided can be used to predict the availability of a localization map already generated using known approaches and localization functions performed on the basis thereof, wherein only map data (e.g. landmarks) from the localization map are required and the use of ground truth is no longer necessary, thus allowing the prediction to be performed regardless of the map size and thus allowing the availability of large-scale localization maps to be predicted.

The classification model provided can also be used to post-process an already existing localization map so that this localization map can provide additional information about map availability. This is also advantageous in the context of the safety-critical automated driving functions.

For example, the localization map is a High Definition (HD) map or a Highly Automated Driving (HAD) map and can be used for autonomous driving. Autonomous driving can be understood as meaning the movement of vehicles that behave largely autonomously, e.g. by means of a GNSS-based localization system and/or sensors for perceiving the environment such as radar, cameras, ultrasonic sensors. The vehicles may be motor vehicles such as cars, lorries or other commercial vehicles, robots or the like.

A machine learning binary classification model is understood here as meaning that the classification model, after training with a training data set has been completed, can output the information as to whether a map section of a localization map is available or unavailable for the localization function, if this map section has been input into the classification model as input data. In other words, the classification model assigns a map section of a localization map to either an availability class or an unavailability class.

A training data set can comprise a large number of data points. A data point is, for example, labelled information that describes a map section. This may mean that a training data set consists of a set of map sections with associated features and class affiliations (labels).

Provision may be made for a data point of a training data set to comprise first information for describing a map section and second information for indicating the localization availability of that map section. The first information can be generated with the aid of a mapping system and the second information can be determined with the aid of ground truth, wherein ground truth can be obtained according to steps a) and b).

Provision can be made for a data point of the training data set to consist of a pair (X, y), where X corresponds to the first information and y corresponds to the second information. X is a generic data vector, and $y \in \{0, 1\}$ describes the class affiliation of X, i.e. the availability of the localization function. The features stored in the data vector X can be generated from a mapping system. A mapping system is used here to mean a system that makes it possible to assign the availability to global coordinates. In particular, information about landmarks such as traffic signs, road boundaries or traffic lights may be used. Information about such landmarks is regularly available with accurate indications of their position in a global coordinate system. Recognizing such landmarks makes it possible to assign data points to global coordinates. Examples of possible features are the number of traffic signs in a map section or the type of road. As an alternative or in addition to a global data vector that codes information over the entire map section, other representations such as a two-dimensional or three-dimensional grid, a point cloud and/or a satellite image can also be used.

According to step a), a reference trajectory will be recorded by a reference journey with a real vehicle. The real vehicle is preferably a localizable vehicle with special high-end sensors such as a camera, radar, lidar and/or GNSS, such that during the reference journey reference sensor data corresponding to the reference trajectory are also captured and recorded using the high-end sensors. When recording the reference trajectory and the reference sensor data, it should be ensured that the recorded reference trajectory is correct and corresponds to the reference sensor data. The landmarks surrounding the reference trajectory can also be determined from the reference sensor data, in which case not only the position, but also the type, of the respective landmarks can be determined. The positions of the landmarks surrounding the reference trajectory, as determined from the reference sensor data, are referred to as referenced landmark positions.

According to step b), an estimated trajectory 3 can be obtained by a virtual journey with a fictitious vehicle along the reference trajectory. For this purpose, a map and a localization unit can be used to perform the localization function. The fictitious vehicle can start the localization unit at a given map point, which also defines, for example, the features of the landmarks captured during the reference journey, thus providing an initial position. The fictitious vehicle can then drive along the reference trajectory at a constant speed for a fixed time step, wherein new landmarks from the map and sensor data, which are, for example, the reference sensor data recorded from the reference journey, are successively supplied as input data to the localization unit, thus obtaining a new estimated position in each case. The estimated positions thus form the estimated trajectory. The "fictitious" vehicle introduced here and the "virtual" journey carried out with it are preferably part of a simulation that can be used to test the localization function based on the localization map. This simulation represents the situation in which a real vehicle would perform the localization function on a real journey. The virtual journey and the fictitious vehicle exist within this simulation for the purpose of generating training data.

According to step c), the second information is determined based on the comparison of the reference trajectory with the estimated trajectory and/or on the comparison of the referenced landmark positions with the estimated landmark positions. A threshold value can be used, and the second information of the data point indicates that the first information of this data point is evaluated as available (i.e. as a positive sample) if neither the deviation between the reference trajectory and the estimated trajectory nor the deviation between the referenced landmark positions and the estimated landmark positions reaches the threshold value. Otherwise, the second information indicates that the first information is evaluated as unavailable (i.e. as a negative sample).

Preferably, steps a) and b) are repeated in order to obtain a large number of reference trajectories and estimated trajectories corresponding to the reference trajectories. Thus, a large number of data points can be provided in step c).

According to step d), the classification model is trained with the provided training data set using artificial intelligence.

In contrast to known approaches in which the availability of a localization map is determined using ground truth, e.g. using certain quality criteria of sensor input data such as the light ratio, in the solution presented here the availability of a localization map is not predicted using ground truth, but using information extracted from this localization map (e.g. landmarks) and with the aid of a previously trained classification model. In particular, it must be distinguished here that ground truth is only used to train the classification model in the solution presented here; no ground truth is used to predict the map availability. In particular, this has the advantage that the solution presented here can be used to predict the availability of a large-scale map, since determining the availability of a map using ground truth can result in a vehicle having to drive over the entire map in order to check whether localization works and is therefore limited to small-scale maps.

It is preferred if in step c) the first information comprises features of the landmarks contained in this map section.

It is preferred if the first information comprises the landmark position of each landmark contained in this map section.

It is preferred if the first information is implemented in the form of a data vector in which the features of the landmarks contained in this map section are stored.

It is preferred if the first information is represented by a grid with grid cells in such a way that the grid is placed over this map section and the features of a landmark contained in this map section are stored in a grid cell if these features are also in this grid cell.

The grid can be two-dimensional (2D) or three-dimensional (3D). In addition, the positions of the landmarks can be coded in the data. Such a multidimensional data representation is usually referred to as a tensor in the context of machine learning. If the classification model accepts input data in the form of tensors (e.g. convolutional neural network), this data representation can be used directly. If only vectorial input data are accepted, the tensor only needs to be rolled out into a one-dimensional vector.

It is preferred if the first information is represented by point clouds in such a way that each landmark contained in this map section is represented by a point in a point cloud.

Here, each landmark can contain, in addition to the position of this landmark, further information, such as the type of that landmark. Neural networks such as Kernel Point Convolution (KPConv), which have been specially developed for this purpose, are needed to process point cloud data.

It is preferred if the first information is additionally provided using a satellite image corresponding to the map section.

It is preferred if in step c) the second information is marked with a zero or a one, wherein the one corresponds to availability and the zero corresponds to unavailability.

It is preferred if in step c) the second information indicates unavailability when the deviation between the reference trajectory and the estimated trajectory reaches a given threshold value.

It is preferred if in step c) the second information indicates unavailability when the deviation between the referenced landmark positions and the estimated landmark positions reaches a given threshold value.

It is preferred if in step d) the classification model is trained using a neural network, a gradient boosted tree, and/or a support vector machine.

Furthermore, a method for providing a localization map having additional availability information using a classification model proposed here and a localization map provided using this method is proposed.

In particular, the localization map is an HD map or an HAD map whose additional availability information indicates where the localization map can and cannot be used for localization. The availability information is critical to the localization products because it defines the Operational Domain (ODD). It should be noted that the accuracy of a localization map is generally a different term than the availability of a localization map. A localization map may be incorrect, but may still be used for localization, and vice versa, a localization map may be correct but not available for positioning.

The method for providing a localization map having additional availability information comprises the following steps of:

i) extracting landmarks from a map section of a localization map, ii) inputting the extracted landmarks into the classification model, and iii) predicting the availability or unavailability of this map section using the classification model, and iv) repeating steps i) to iii) in order to predict the availability or unavailability of a further map section until the entire localization map is annotated with availability information.

The concepts presented here have the feature in common that this is an AI-based prediction of the availability of map-based localization. First, a machine learning binary classification model is provided using ground truth, with the result that the availability of an already existing localization map in different map sections can be predicted with the aid of this classification model, even without ground truth, in which case only map data (e.g. landmarks) from the localization map are required, and so there is no longer a restriction to small-scale localization maps and it becomes possible to predict the availability of large-scale localization maps. In this way, an already existing large-scale localization map can also be further processed into a new localization map having additional availability information. In particular, the solution presented here is independent of the approach used to generate the existing localization map. With the solution presented here, it is therefore possible to further process various localization maps flexibly in order to supplement the availability information accordingly.

The solution presented here and its technical environment are explained in more detail below using the figures. It should be pointed out that the invention is not intended to be limited by the exemplary embodiments shown. In particular, it is also possible, unless explicitly stated otherwise, to extract partial aspects of the facts explained in the figures and to combine them with other components and/or findings from other figures and/or the present description. Schematically and by way of example:

FIG. 1 shows schematically and by way of example a virtual journey along a reference trajectory 1 in order to form an estimated trajectory 3.

Figure 1:
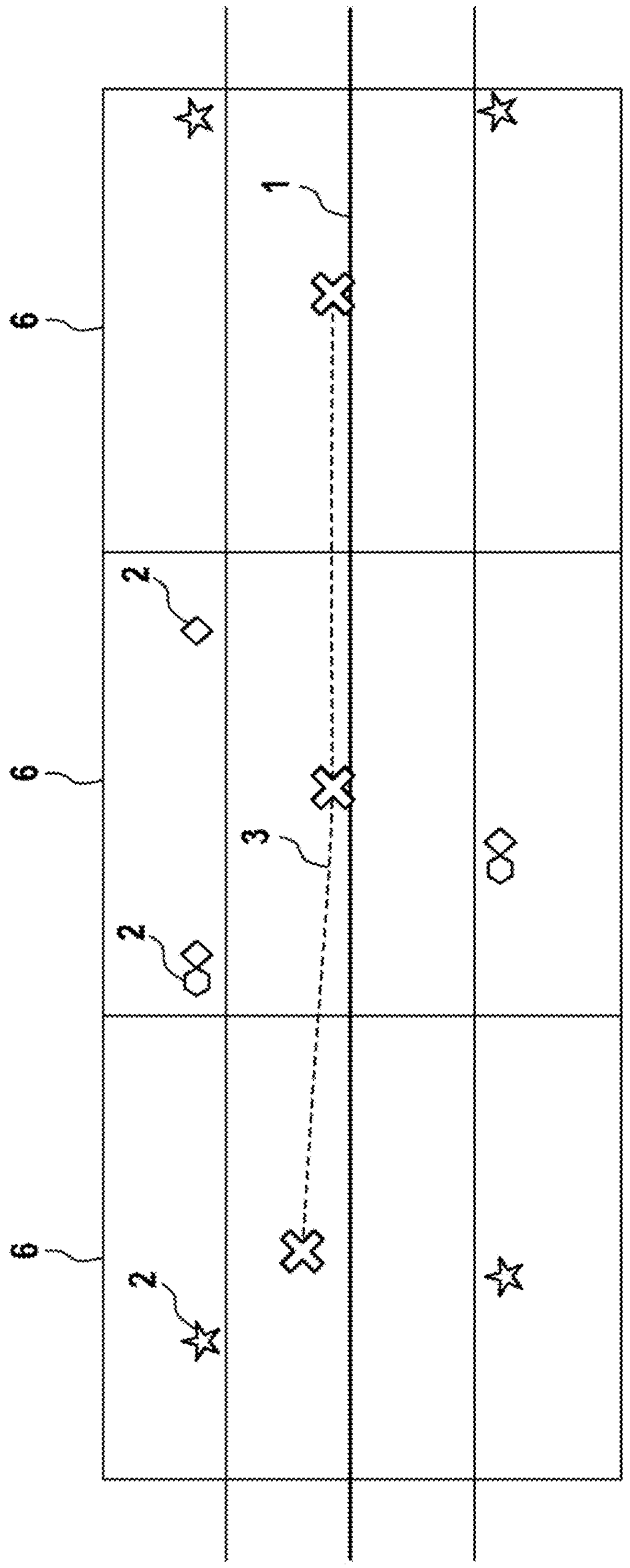
FIG. 1 shows a virtual journey along a reference trajectory in order to form an estimated trajectory.

The reference trajectory 1 is indicated in FIG. 1 by a solid line and can be recorded in method step a) by way of a reference journey with a real vehicle. The real vehicle is preferably a localizable vehicle with special high-end sensors such as a camera, radar, lidar and/or GNSS, such that during the reference journey reference sensor data corresponding to the reference trajectory are also captured and recorded using the high-end sensors. When recording the reference trajectory 1 and the reference sensor data, it should be ensured that the recorded reference trajectory 1 is correct and corresponds to the reference sensor data.

The landmarks surrounding the reference trajectory 1 can also be determined from the reference sensor data, in which case not only the position, but also the type, of the respective landmarks can be determined. The positions of the landmarks surrounding the reference trajectory 1, as determined from the reference sensor data, are referred to as referenced landmark positions 2. The different types of landmarks are shown in FIG. 1 as a pentagram, hexagon and rhombus.

The estimated trajectory 3 is indicated in FIG. 1 by a dashed line and can be obtained in method step b) by way of a virtual journey with a fictitious vehicle along the reference trajectory 1. For this purpose, a map and a localization unit can be used to perform the localization function. The fictitious vehicle can start the localization unit at a given map point, which also defines, for example, the features of the landmarks captured during the reference journey, thus providing an initial position. The fictitious vehicle can then drive along the reference trajectory 1 at a constant speed for a fixed time step 6, wherein new landmarks from the map and sensor data, which are, for example, the reference sensor data recorded from the reference journey, are successively supplied as input data to the localization unit, thus obtaining a new estimated position in each case. The estimated positions thus form the estimated trajectory 3.

Figure 2:
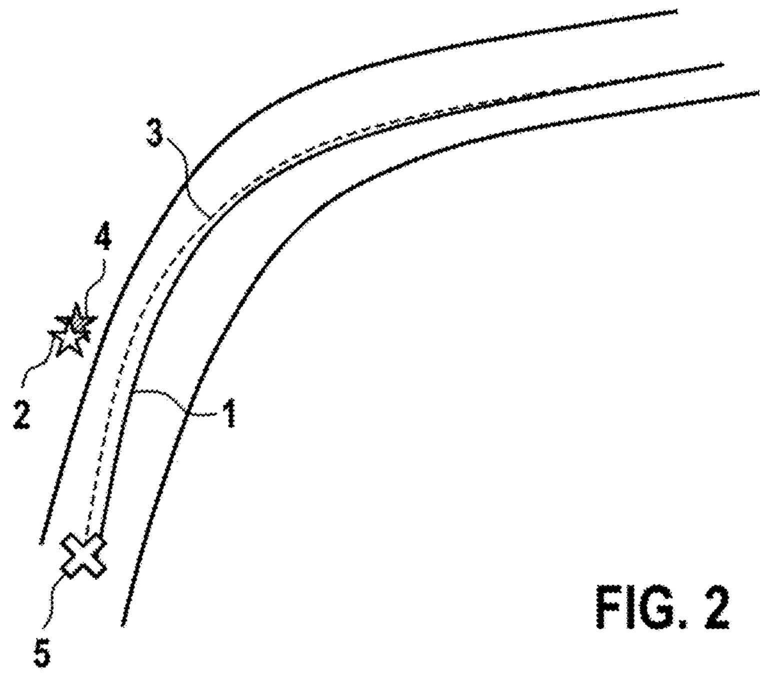
FIG. 2 shows an embodiment variant for providing the second information of a data point of a training data set.

FIG. 2 shows schematically and by way of example an embodiment variant for providing the second information of a data point of a training data set. It can be seen in FIG. 2 that the estimated trajectory 3 starts from a starting point 5 and converges towards the reference trajectory 1, and the deviation between the referenced landmark position 2 of an affected landmark and the corresponding estimated landmark position 4 is small. In this case, the second information can indicate that the first information of the data point is evaluated as available (i.e. as a positive sample).

Figure 3:
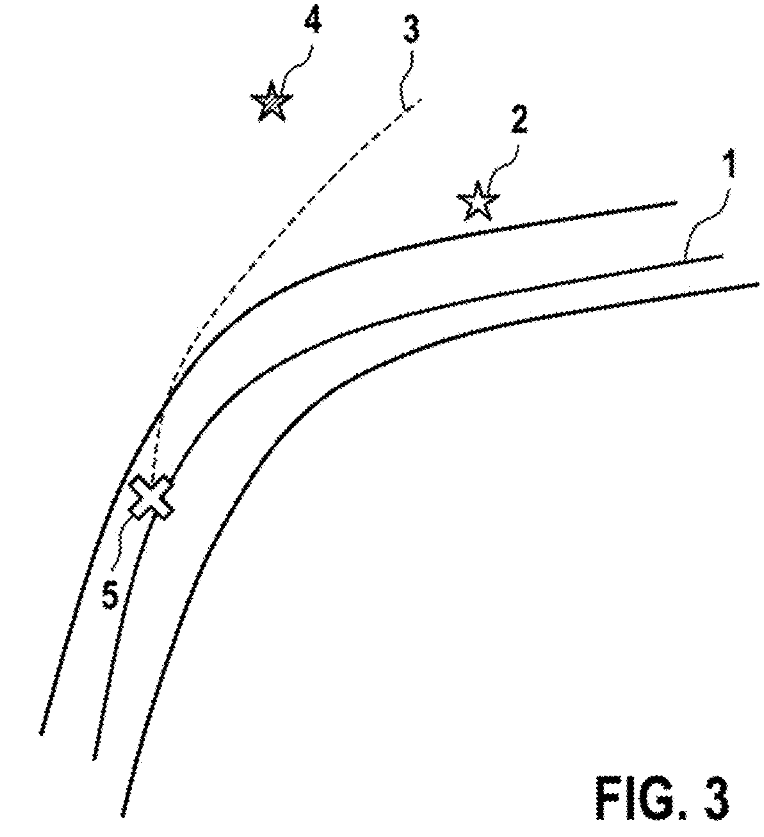
FIG. 3 shows a further embodiment variant for providing the second information of a data point of a training data set.

FIG. 3 shows schematically and by way of example a further embodiment variant for providing the second information of a data point of a training data set. It can be seen in FIG. 3 that the estimated trajectory 3 starts from a starting point 5 and does not converge towards the reference trajectory 1, and the deviation between the referenced landmark position 2 of an affected landmark and the associated estimated landmark position 4 is large. In this case, the second information can indicate that the first information of the data point is evaluated as unavailable (i.e. as a negative sample).

Figure 4:
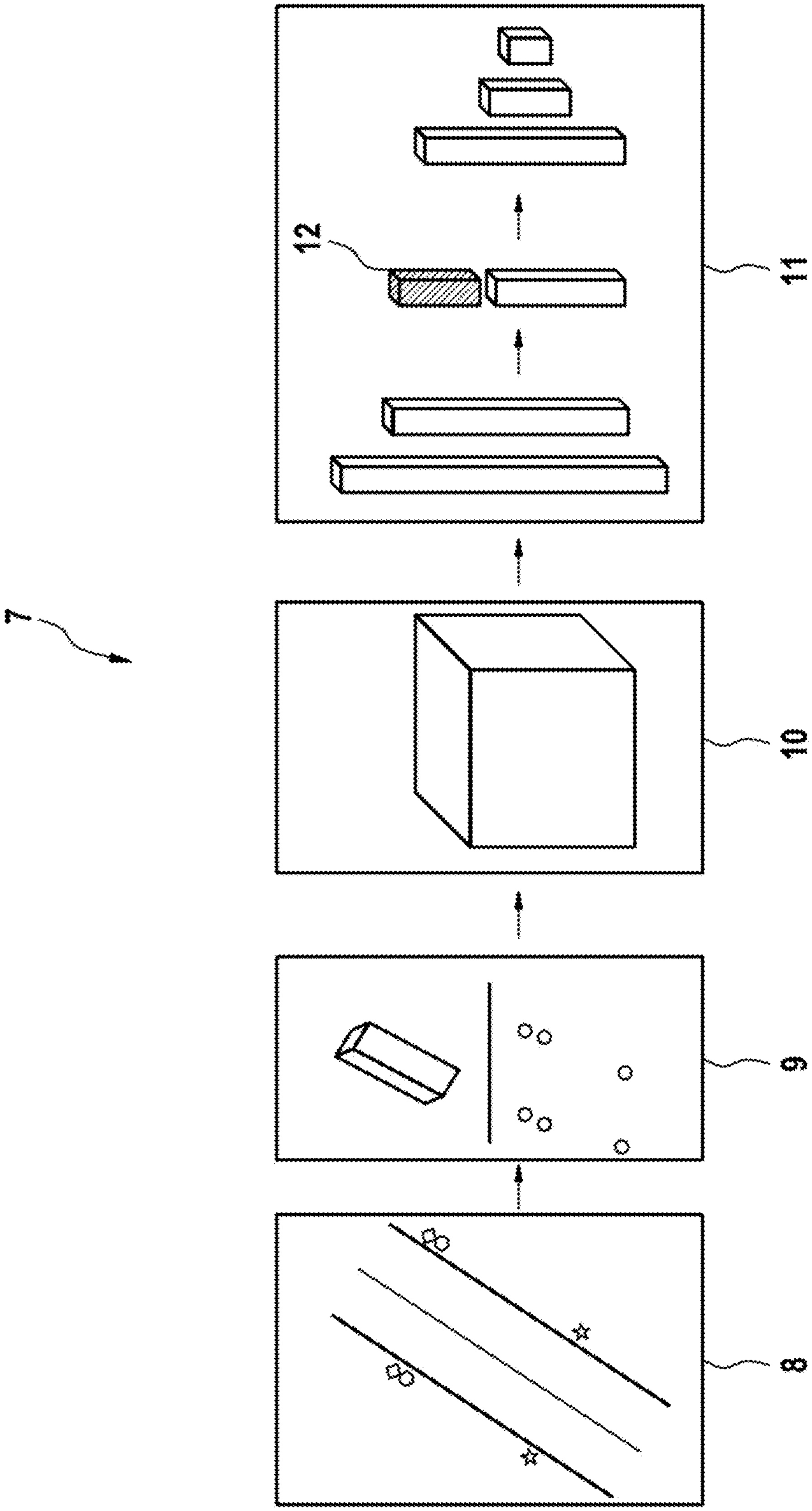
FIG. 4 shows an architecture of a proposed classification model.

FIG. 4 shows schematically and by way of example the architecture of a proposed classification model 7. A data representation 9 is derived from a map section 8. Optionally, an aerial image of this map section 8 can also be additionally used as an information source. The data representation 9 can be in the form of a tensor or a point cloud and can be input into an encoder network 10. The encoder network 10 then processes the data representation 9 to form a fixed-size vector. The encoder network 10 can be in the form of a convolutional neural network, a kernel point convolution (KPConv) or a combination of both. This vector can then be input into a classification network 11. The classification network 11 processes this vector further to form a single scalar value that predicts the class affiliation, i.e. the availability or unavailability of this map section 8. The classification network 11 can comprise a plurality of dense layers. Optionally, additional global features 12 can be added to the classification network 11.

The invention claimed is:

1. A method for providing a machine-learning binary classification model for predicting the availability of a localization function performed based on a localization map, comprising the following steps of:

a) performing a reference journey with a real vehicle, wherein a reference trajectory and referenced landmark positions surrounding the reference trajectory are recorded, b) performing a journey along the reference trajectory with a fictitious vehicle, wherein a trajectory and landmark positions surrounding the trajectory are estimated using the localization function, c) providing a training data set having data points such that a data point comprises first information for describing a map section and second information for indicating a localization availability of the localization function for that map section, wherein the map section corresponds to the environment of the reference trajectory, and the second information is determined based on the comparison of the reference trajectory with the estimated trajectory and/or on the comparison of the referenced landmark positions with the estimated landmark positions, and d) training the classification model with the training data set using artificial intelligence.

2. The method according to claim 1, wherein in step b) the fictitious vehicle drives along the reference trajectory at a constant speed for a fixed time step.

3. The method according to claim 1, wherein in step c) the first information is generated using a mapping system.

4. The method according to claim 1, wherein in step c) the first information comprises features of the landmarks contained in this map section.

5. The method according to claim 4, wherein the first information comprises the landmark position of each landmark contained in this map section.

6. The method according to claim 4, wherein the first information is implemented in the form of a data vector in which the features of the landmarks contained in this map section are stored.

7. The method according to claim 4, wherein the first information is represented by a grid with grid cells in such a way that the grid is placed over this map section and the features of a landmark contained in this map section are stored in a grid cell if these features are also in this grid cell.

8. The method according to claim 4, wherein the first information is represented by point clouds in such a way that each landmark contained in this map section is represented by a point in a point cloud.

9. The method according to claim 4, wherein the first information is additionally provided using a satellite image corresponding to the map section.

10. The method according to claim 1, wherein in step c) the second information is marked with a zero or a one, wherein the one corresponds to availability and the zero to unavailability.

11. The method according to claim 1, wherein in step c) the second information indicates unavailability when the deviation between the reference trajectory and the estimated trajectory reaches a given threshold value.

12. The method according to claim 1, wherein in step c) the second information indicates unavailability when the deviation between the referenced landmark positions and the estimated landmark positions reaches a given threshold value.

13. The method according to claim 1, wherein in step d) the classification model is trained using a neural network, a gradient boosted tree, and/or a support vector machine.

14. The method according to claim 1, wherein the method comprises the following steps of:

i) extracting landmarks from a map section of a localization map, ii) inputting the extracted landmarks into the classification model, and iii) predicting the availability or unavailability of this map section using the classification model, and iv) repeating steps i) to iii) in order to predict the availability or unavailability of a further map section until the entire localization map is annotated with availability information.

* * * * *